(12) United States Patent
Forster et al.

(10) Patent No.: US 7,662,204 B2
(45) Date of Patent: Feb. 16, 2010

(54) DEVICE FOR PURIFYING EXHAUST GASES OF A MOTOR VEHICLE AND METHOD FOR THE PRODUCTION THEREOF

(75) Inventors: Erich Forster, Grossaitingen (DE); Peter Kroner, Augsburg (DE); Otto Steinhauser, Neusaess (DE)

(73) Assignee: Emcon Technologies LLC, Wilmington, DE (US)

( * ) Notice: Subject to any disclaimer, the term of this patent is extended or adjusted under 35 U.S.C. 154(b) by 224 days.

(21) Appl. No.: 11/572,971

(22) PCT Filed: Jul. 28, 2005

(86) PCT No.: PCT/EP2005/008210

§ 371 (c)(1),
(2), (4) Date: Jan. 30, 2007

(87) PCT Pub. No.: WO2006/015730

PCT Pub. Date: Feb. 16, 2006

(65) Prior Publication Data

US 2008/0093421 A1    Apr. 24, 2008

(30) Foreign Application Priority Data

Aug. 3, 2004    (DE) ........................ 10 2004 037 480

(51) Int. Cl.
| | |
|---|---|
| B01D 39/06 | (2006.01) |
| B01D 24/00 | (2006.01) |
| B01D 39/14 | (2006.01) |
| B01D 50/00 | (2006.01) |
| F01N 3/10 | (2006.01) |
| F01N 3/08 | (2006.01) |
| F16L 11/00 | (2006.01) |

(52) U.S. Cl. .............. 55/523; 55/522; 55/524; 422/170; 422/171; 422/172; 422/173; 422/174; 422/175; 422/176; 422/177; 422/178; 422/179; 422/180; 422/181; 422/182; 138/137

(58) Field of Classification Search ........... 55/522–524; 137/138; 422/170–182
See application file for complete search history.

(56) References Cited

U.S. PATENT DOCUMENTS

| | | | | | |
|---|---|---|---|---|---|
| 3,854,888 | A | * | 12/1974 | Frietzsche et al. ........... | 422/171 |
| 3,856,315 | A | * | 12/1974 | Stansbury .................... | 277/625 |
| 4,020,539 | A | * | 5/1977 | Vroman ....................... | 29/890 |
| 4,163,042 | A | * | 7/1979 | Lynch ......................... | 422/179 |
| 4,223,895 | A | * | 9/1980 | Roberts et al. .............. | 277/625 |
| 4,248,833 | A | * | 2/1981 | Aoyama ...................... | 422/179 |
| 4,344,921 | A | * | 8/1982 | Santiago et al. ............. | 422/179 |

(Continued)

FOREIGN PATENT DOCUMENTS

DE    196 26 692 A1    1/1998

(Continued)

*Primary Examiner*—Walter D Griffin
*Assistant Examiner*—Amber Orlando
(74) *Attorney, Agent, or Firm*—Carlson Gaskey & Olds, P.C.

(57) ABSTRACT

A vehicle exhaust gas purification device has a multipart outer housing (10) including a tube (12) and end walls (14) that have been reshaped into funnels. The tube (12) and the end walls (14) are fitted into each other and brazed, soldered or welded to each other.

29 Claims, 4 Drawing Sheets

U.S. PATENT DOCUMENTS

| | | | | |
|---|---|---|---|---|
| 4,446,942 | A * | 5/1984 | Hardt et al. | 181/249 |
| 4,735,640 | A * | 4/1988 | Thornburgh et al. | 55/315 |
| 5,118,476 | A * | 6/1992 | Dryer et al. | 422/179 |
| 5,613,992 | A * | 3/1997 | Engel | 55/432 |
| 5,656,245 | A | 8/1997 | Fujisawa et al. | |
| 5,683,660 | A * | 11/1997 | Wirth et al. | 422/171 |
| 5,902,365 | A * | 5/1999 | Haggard | 55/498 |
| 5,957,163 | A * | 9/1999 | Ito et al. | 138/109 |
| 5,988,695 | A * | 11/1999 | Corbett, Jr. | 285/110 |
| 6,253,792 | B1 | 7/2001 | Wadsworth et al. | |
| 6,334,981 | B1 * | 1/2002 | Wieres | 422/177 |
| 6,463,655 | B1 | 10/2002 | Wadsworth et al. | |
| 6,550,775 | B2 * | 4/2003 | Knapp | 277/314 |
| 6,814,771 | B2 * | 11/2004 | Scardino et al. | 55/385.3 |
| 6,877,780 | B2 * | 4/2005 | Potts et al. | 285/420 |
| 7,160,519 | B1 * | 1/2007 | Norby et al. | 422/168 |
| 2002/0071791 | A1 | 6/2002 | Foster et al. | |
| 2004/0258583 | A1 * | 12/2004 | Hardesty et al. | 422/179 |
| 2006/0213163 | A1 * | 9/2006 | Taoka et al. | 55/523 |

FOREIGN PATENT DOCUMENTS

| | | |
|---|---|---|
| WO | WO 99/17905 | 4/1999 |
| WO | WO03078026 * | 9/2003 |

* cited by examiner

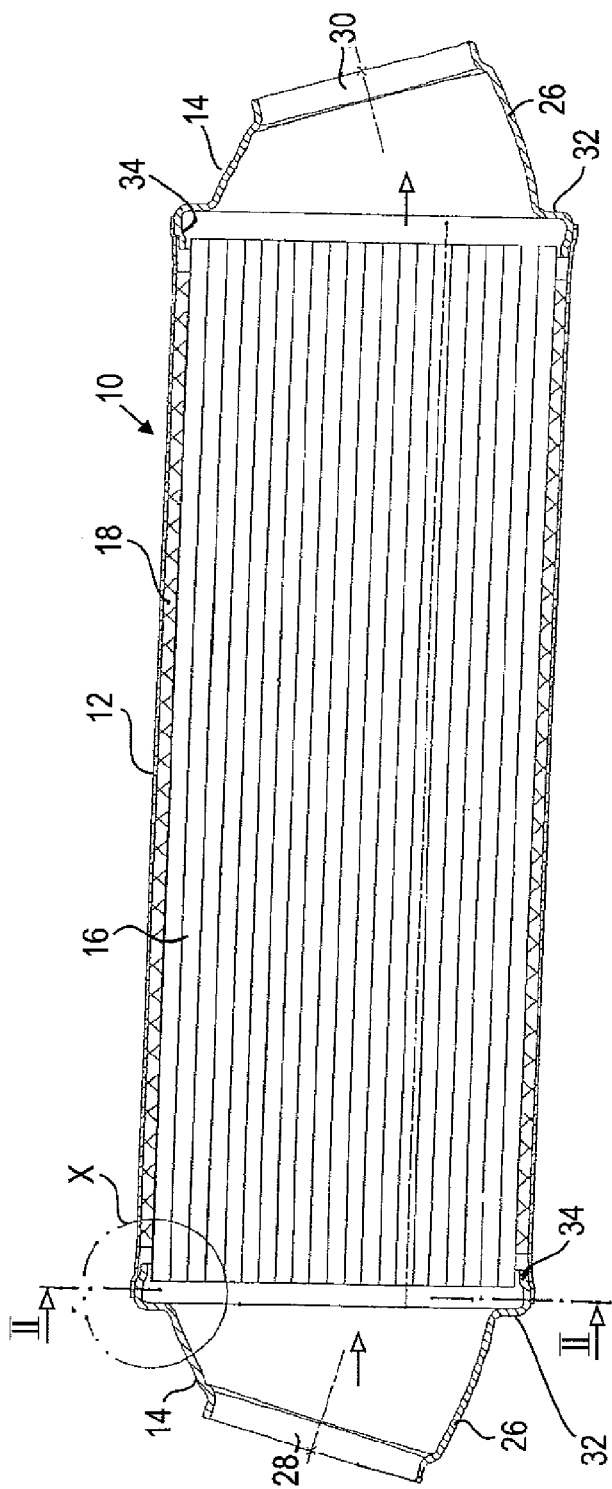
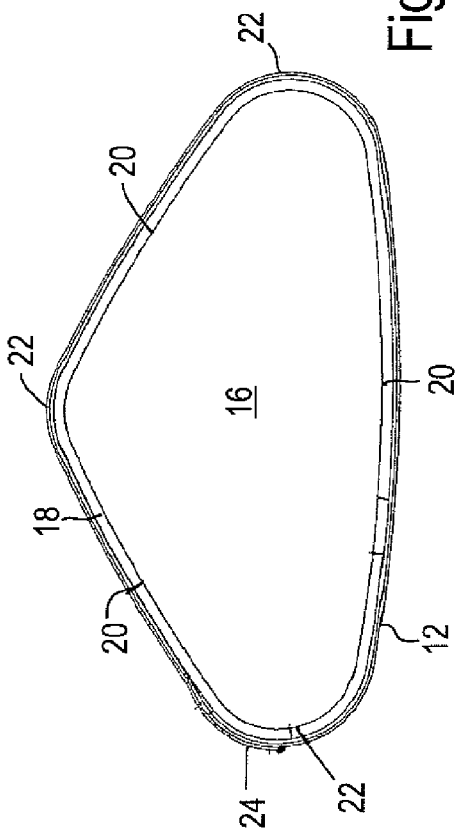

DEVICE FOR PURIFYING EXHAUST GASES OF A MOTOR VEHICLE AND METHOD FOR THE PRODUCTION THEREOF

CROSS REFERENCE TO RELATED APPLICATIONS

This application is a U.S. national counterpart application of international application serial No. PCT/EP2005/008210 filed Jul. 28, 2005, which claims priority to German Patent Application No. 102004037480.5 filed Aug. 3, 2004. The entirety of both of which is hereby incorporated by reference.

TECHNICAL FIELD

The invention relates to a vehicle exhaust gas purification device comprising a multipart outer housing including a tube formed by a continuous jacket part and end walls which are provided at the axial ends of the tube and have an inlet and an outlet, and a filter body accommodated in the outer housing, the exhaust gas flowing through the filter body and being purified by it.

BACKGROUND

Vehicle exhaust gas purification devices of this type are catalytic converters or particulate filters, for example. The filter bodies are formed by, e.g., extruded one-piece monolithic single bodies bonded to each other, in particular of an SiC material. The end walls of the outer housing have funnel portions flaring towards the tube and being adjoined by a radial annular portion. An insulation or intumescent mat is wrapped around a filter body inside the device, and a sheet metal jacket is then wrapped around the mat. This sheet metal jacket is turned into a tube by a longitudinal weld seam. The end walls are then applied at the two axial ends of the tube, the end faces of the tube axially abutting the radial portions and the radial portions still slightly projecting outwards beyond the tube. The end walls are finally welded to the tube in this projecting area.

The weld seam between the end walls and the tube is a so-called burn-off seam. Great efforts need to be made in terms of process engineering for this burn-off seam to withstand the required bending fatigue strengths. Furthermore, the dimensions and geometries of the axial ends of the tube and of the projecting radial portion of each end wall need to be strictly observed in order to produce a seam of consistent quality. Otherwise, the radial portion would protrude to a greater or lesser extent on the periphery in relation to the tube, which would result in a weld seam of non-uniform quality along the periphery.

SUMMARY

The invention provides a vehicle exhaust gas purification device which is simpler to produce while having, on an average, a higher quality. In addition, a method of producing the vehicle exhaust gas purification device according to the invention is to be proposed.

In a vehicle exhaust gas purification device of the type initially mentioned, for this purpose provision is made that at least one end wall has an essentially cylindrical, reshaped jacket extension which is angled towards the tube and against which the tube rests in the radial direction. The tube and at least one end wall, preferably both, are fitted axially into each other and then lie radially against each other, i.e. they mutually position one another. The complicated positioning that had previously been required between the end walls and the tube can thus be dispensed with. A higher process security is attained for the subsequent welding, brazing or soldering. The change in geometry results in a more homogeneous flux of force, and the notch effect of the weld seam is eliminated owing to its different position.

The device according to the invention is suitable not only for the connection of circular cylindrical tubes to the end walls, but also of geometries other than these, such as so-called tri-oval tubes. Such tubes are largely triangular, with heavily rounded corners; instead of the flat faces of the triangle, faces having a large curvature may also be provided.

A further advantage achieved by the invention resides in the very exactly adjustable axial compression of a knitted wire mesh ring which hitherto was axially clamped between the associated end wall and the filter body in the region of the inside edge. The axial insertion of the tube and the end walls into each other allows an exact adjustment of the axial biasing force.

The seam between the end wall and the tube exhibits substantially lower tolerances than in the prior art, where a burn-off seam had been provided. In the prior art a problem is presented above all by the non-uniform contour of the tube formed by coiling; such contour does not permit an exactly predefinable and consistent position relative to the end walls.

It is also easier to avoid gaps between the tube and the end wall by fitting the parts into each other.

The jacket extension and/or the associated tube end should be narrowed radially inwards or widened radially outwards towards the axial ends thereof to form an insertion chamfer for fitting the jacket extension and the tube axially together. This may facilitate the assembly.

This insertion chamfer is most easily produced by a plastic non-cutting shaping process of the jacket extension and/or the associated tube end, rather than by machining.

According to the preferred embodiment, the inside part (tube end or jacket extension) is retracted radially farther inwards, compared with the middle of the tube. This narrowing process causes the inside part to protect the so-called support mat, which is wrapped around the filter body, from excessive erosion and exposure to heat.

In addition, according to one configuration provision is made that the end wall or walls designed with the jacket extension has/have a funnel portion (inlet or outlet channel) flaring towards the tube and a radial portion adjoining the funnel portion towards the tube. The jacket extension then adjoins the radial portion.

The jacket extension is formed by deep-drawing and subsequent axial trimming. Only in the next step is the trimmed edge plastically deformed radially inwards, which is also referred to as reduction in diameter. The advantages resulting from this will be discussed further below with reference to the drawings.

One particularly preferred embodiment with a view to high process security and simple, easy assembly of the outer housing is obtained if an axially acting latching connection is provided between the tube and the jacket extension. This latching connection preferably serves for a pre-assembly location between the tube and the jacket extension. This means that the end walls and the tube are fitted axially into each other and the axial positioning is achieved by the latching connection. No additional tool is necessary for an exact positioning of the parts in relation to each other for the subsequent welding, brazing or soldering process. The end wall or walls and the tube are already correctly aligned, both axially by means of the latching connection and radially by means of the plug-type connection. In this way, the overall tool costs for the assembly of the tube and the end walls and also for the retention during the subsequent welding, brazing or soldering process may be reduced.

The latching connection is constituted for example by an indentation and at least one projection on the tube or on the jacket extension, which protrudes into the indentation. The indentation and the projection are produced simply by plastic reshaping of the respective parts.

Provision may be made for one encircling projection, for example. Moreover, it would also be conceivable to provide a plurality of projections, spaced apart from each other peripherally, which possibly facilitates the axial insertion of the tube and the end walls into each other.

In the method according to the invention of producing the vehicle exhaust gas purification device set forth above, the following steps are provided:

(a) the tube and at least one end wall are fitted axially into each other, and (b) the tube and the end wall are connected with each other by welding, brazing or soldering.

As already explained above, this results in a higher process security and less fluctuations in the quality of the weld seam.

The funnel portion is formed by deep-drawing the end wall.

The jacket extension is preferably formed by deep-drawing the end wall on the edge, a flange that extends radially outwards projecting from the jacket extension towards the free edge. This flange is usually made use of to clamp the edges of the end wall in the deep-drawing die. The deep-drawing process is followed by severing the flange.

Such severing should be carried out before the edge that has been produced by the severing process is reshaped inwards, so that the end wall can be produced within closer axial tolerances.

As already mentioned above, when the tube and the end wall are fitted into each other, they may be locked in place and be axially positioned thereby.

BRIEF DESCRIPTION OF THE DRAWINGS

Further features and advantages of the invention will become apparent from the description given below and from the accompanying drawings to which reference is made and in which:

FIG. 1 shows a longitudinal sectional view of a first embodiment of the vehicle exhaust gas purification device according to the invention;

FIG. 2 shows a cross-sectional view of the device along the line II-II in FIG. 1;

DETAILED DESCRIPTION OF THE DRAWINGS

Figure 3:
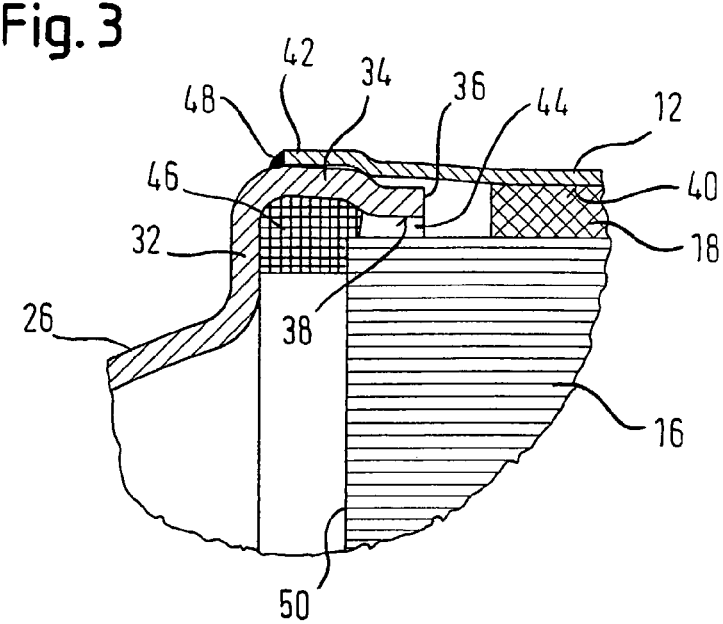
FIG. 3 shows an enlarged view of the area denoted by X in FIG. 1.

FIG. 1 illustrates a vehicle exhaust gas purification device which is accommodated in the exhaust gas system. The device has a three-part outer housing 10 including a tube 12 that is longitudinally welded from a metal sheet and forms a surrounding jacket, and end walls 14 mounted to the open end faces of the tube 12. Accommodated inside the outer housing 10 is a filter body 16 in the form of a monolith-type diesel particulate filter or a catalytic converter, through which the exhaust gas passes (see arrows). Wrapped around the filter body 16 is an insulation or intumescent mat 18, which supports the filter body 16 in the outer housing 10 with a non-positive fit. The mat 18 also serves for tolerance compensation and for limiting the biasing force exerted on the filter body 16 by the outer housing 10.

The filter body 16 and the tube 12 each have an outer geometry which deviates from the circular ring shape and is defined by three sections 20 that are flat or not curved at all and three relatively heavily curved sections 22 that connect the sections 20 (FIG. 2).

In FIG. 2 it is also clearly visible that the tube 12 is formed by a metal sheet which is wrapped around the filter body 16 and the mat 18 and is closed peripherally at its outer longitudinal edge 24 by welding.

The two end walls 14 are produced by deep-drawing and each have a funnel portion 26 which flares towards the tube 12 and constitutes an inlet 28 and an outlet 30, respectively, for inflowing and outflowing exhaust gas. Each funnel portion 26 is adjoined by a radial portion 32 towards the tube 12. Adjacent to the radial portion 32 there is then a cylindrical jacket extension 34 which is angled towards the tube 12 and by which the end walls 14 are inserted into the inside of the tube 12 and by which they rest against the tube 12 in the radial direction.

As can be seen in FIG. 3, the jacket extension 34 is reduced in diameter inwards towards the free edge 36, so that the inner side 38 protrudes farther inwards than the inner side 40 of the tube 12 in the area of the middle of the tube. The tube 12 in turn slightly widens radially outwards towards its free axial end in the region 42.

This provides both the tube 12 and the jacket extension 34 with an insertion chamfer which makes it easier to fit the end wall 14 and the tube 12 axially into each other. Owing to the free edge 36 of the jacket extension 34, drawn inwards by plastic deformation, the annular gap 44 between the outer periphery of the filter body 16 and the inner side of the outer housing 10 (here the inner side 40) is reduced. This results in a lower mass flow rate of hot gas through the annular gap 44 and thus both in lower bypass flows and a reduced thermal stress on the mat 18.

As illustrated in FIG. 3, a knitted wire mesh ring 46 may be optionally clamped axially between the radial portion 32 and the end wall 50 of the filter body 16, such knitted wire mesh ring further reducing the bypass flow and clamping the filter body 16 in the axial direction.

It can be seen in FIG. 3 that the tube 12 has a lower wall thickness than the end wall 14. The tube 12 and the end walls 14 are welded, brazed or soldered at the axial ends of the tube along the entire periphery. The respective weld seam is denoted by the reference numeral 48.

Figure 4:
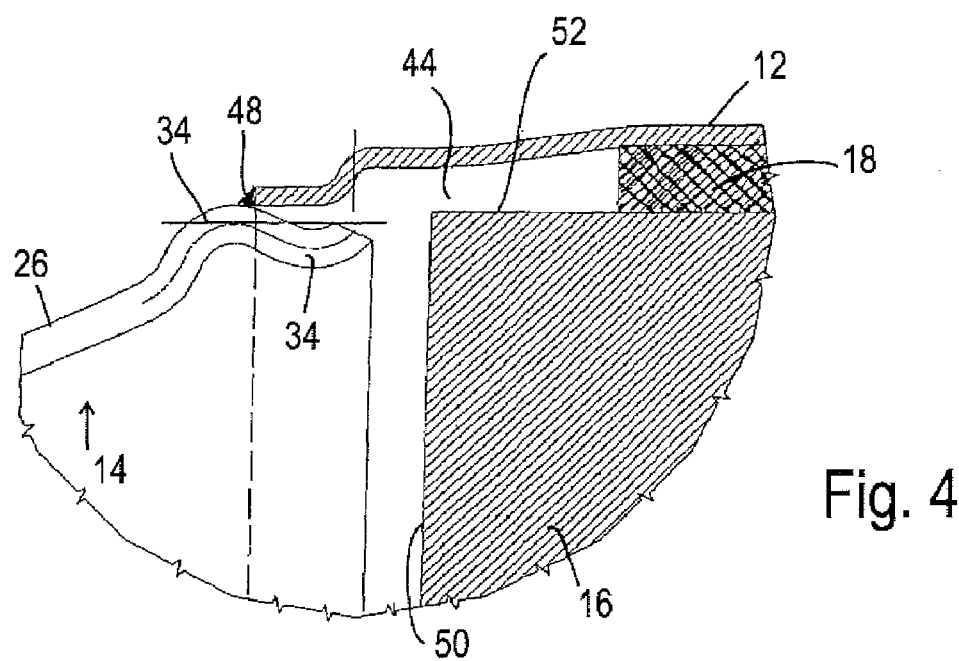
FIG. 4 shows the area illustrated in FIG. 3 in a slightly modified embodiment.

The embodiment according to FIG. 4 essentially corresponds to the one just described, so that the parts of identical function are given the reference numerals already introduced above and only the differences will be discussed below.

In this embodiment, too, at least the end wall 14 shown is fitted into the tube 12. The radial portion 32 is hardly formed here, so that the funnel portion 26 makes an almost immediate transition into the jacket extension 34. In contrast to the engagement over an area of the jacket extension 34 on the inner side of the tube 12 according to FIG. 3, in this embodiment actually only a line-shaped point contact is provided here.

The jacket extension 34 terminates upstream of the end wall 50 of the filter body 16 and radially inwards of the outer periphery 52 thereof. In this embodiment, too, the free edge 36 of the jacket extension 34 is drawn inwards, more specifically so as to be arc-shaped in cross-section. This configuration results in the flow to be directed towards the end wall 50, and the resultant bypass flow in the annular gap 44 is low. While the jacket extension 34 does have an insertion chamfer, the tube 12, unlike in the embodiment mentioned above, does not; the tube 12 runs radially obliquely inwards towards its axial ends in order to thereby reduce the annular gap 44.

Figure 5:
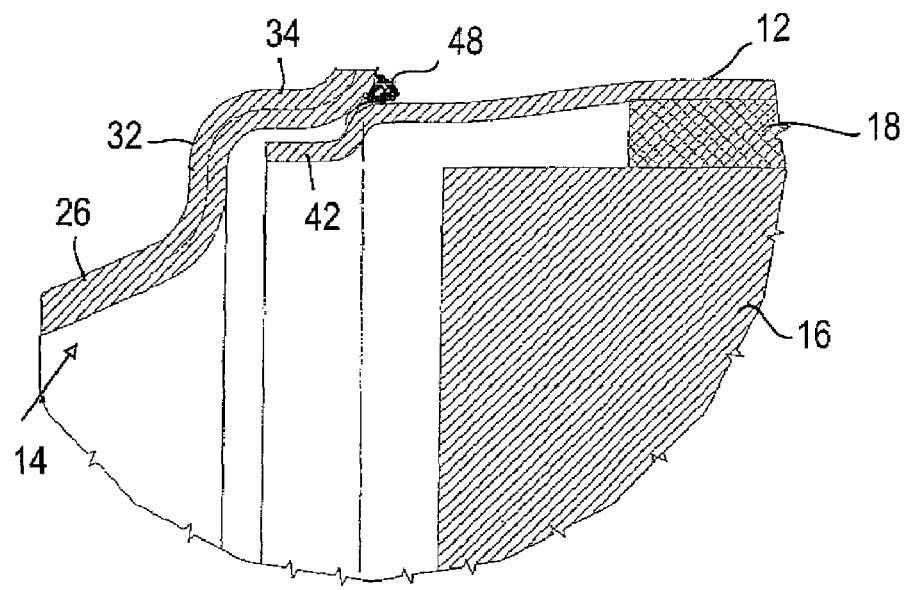
FIG. 5 shows the area illustrated in FIG. 3 in a further modified embodiment.

In the embodiment shown in FIG. 5, the tube 12 is likewise drawn radially obliquely inwards towards its axial end, but the end wall 14 is fitted onto the tube 12, the region 42 thereof engaging the inner side of the slightly flaring jacket extension 34 essentially with a line contact.

Figure 6:
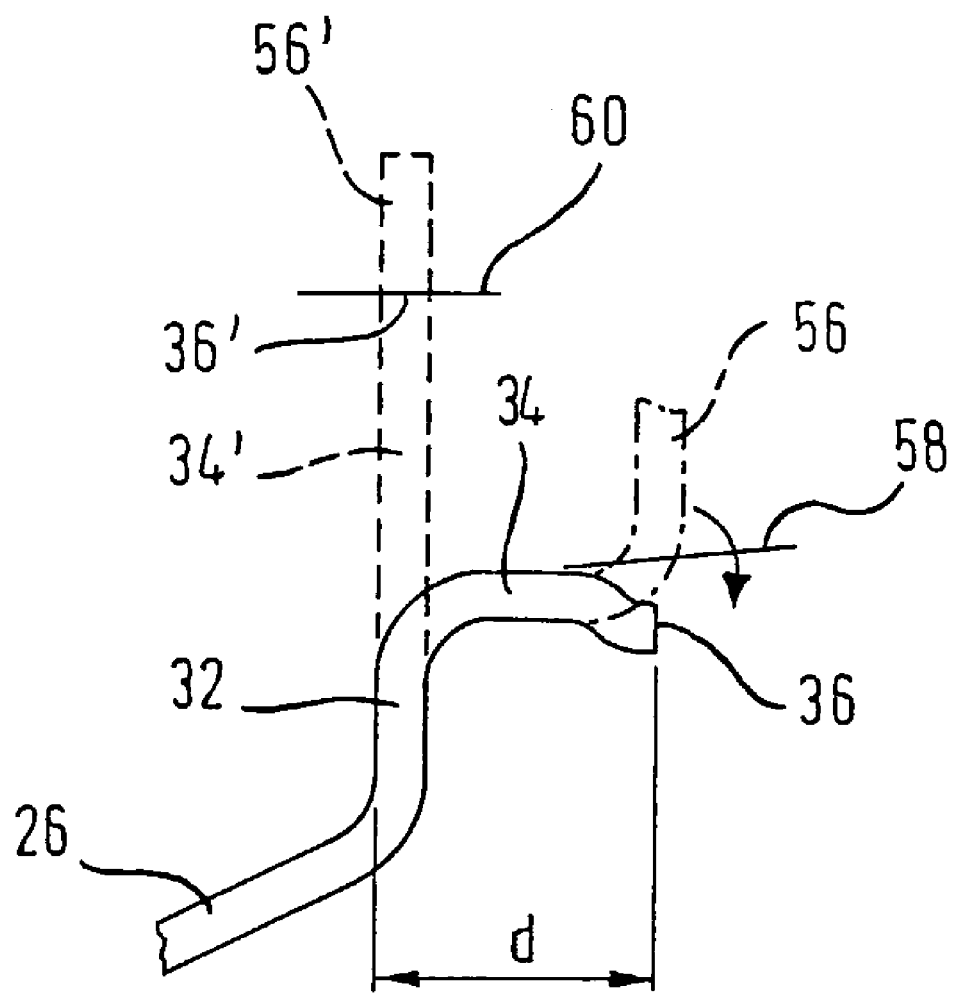
FIG. 6 shows the device in the area of the corner connection illustrated in FIG. 3, in different method steps.

It will now be briefly explained with reference to FIG. 6 how the end walls 14 in the area of the jacket extension are produced. The originally flat metal sheet is provided with an opening and clamped in the deep-drawing die along its outer edge (flange 56) and is then deep-drawn. A kind of shoulder is produced between the jacket extension 34 and the radial portion 32 and also the following funnel portion 26. In the next step, the flange 56 is severed off in the area of the outer periphery of the jacket extension 34. The trim line is designated by 58. Then the free edge 36, formed by the trimming, is reshaped inwards in the direction of the arrow to form the insertion chamfer. In this reshaping process, the jacket extension 34 as a whole is or may be made to taper slightly conically inwards. This method results in a very exact dimension d between the radial portion 32 and the outermost end of the free edge 36 in the axial direction.

A slightly modified method, in which the jacket projection 34 is not formed right away during the deep-drawing process, makes provision for a substantially broader flange 56' to be formed. This broader flange 56' is then cut to size along the trim line 60. In the next step the resultant free edge 36' is bent inwards by more than 90 degrees so that the jacket extension 34 and a certain insertion chamfer are produced. But since part of the material starts to creep when it is bent over at the narrow radii between the jacket extension 34 and the radial portion 32, i.e. creeps lengthwise, the dimension d is very difficult to keep within close tolerances.

Figure 7:
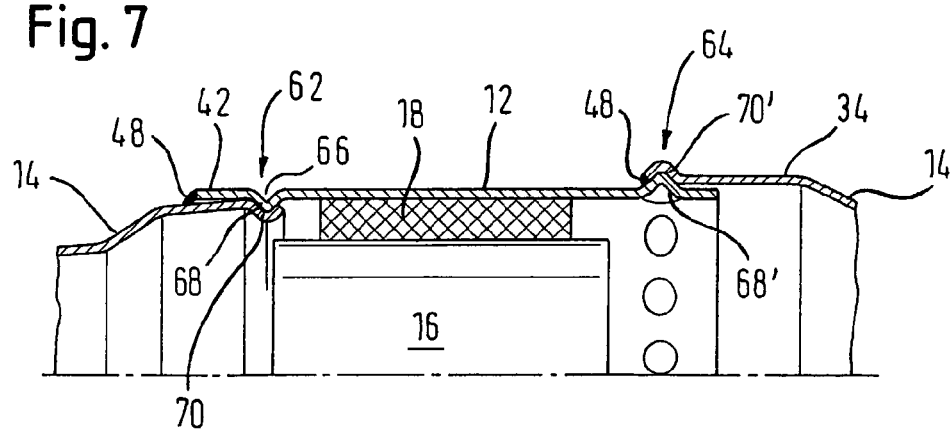
FIG. 7 shows a half section taken through a further embodiment of the device according to the invention.
Figure 8:
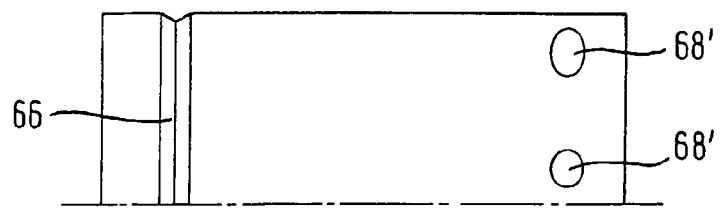
FIG. 8 shows a top view onto the tube of FIG. 7, only one half being illustrated.

In FIGS. 7 and 8 the tube 12 and the end walls 14 are already pre-assembled in the axial direction by a latching connection 62, 64, which acts in the axial direction, before the weld seams 48 are applied. To this end, the tube 12, related to the left-hand end thereof, has a surrounding bead 66 in the region 42 (FIG. 8), the bead 66 forming a continuous projection 68 on the inside. The jacket extension 34 has a corresponding groove-shaped depression 70 into which the projection 68 locks when the left-hand end wall 14 is pushed into the tube 12.

In the latching connection 64 at the opposite end, the tube 12 has point-shaped projections 68' formed therein, which point radially outwards and snap into an encircling depression 70' in the jacket extension 34 which engages over the tube end. Another alternative would be for the jacket extension 34 to likewise have complementarily formed point-shaped depressions 70', whereby the tube 12 and the end wall 14 are oriented in relation to each other in the peripheral direction as well.

It should be appreciated that the end wall 14 may, of course, also be an intermediate piece between two filter bodies connected in series.

In addition, so-called double-walled end wall units may also be employed in practising the invention. These are metal sheets formed into funnels and fitted into each other, which preferably have a shared point of connection with the tube. Behind this point of connection, however, they have an annular gap between them, which serves for thermal insulation.

The invention claimed is:

1. A vehicle exhaust gas purification device comprising:
a multipart outer housing including (i) a tube formed by a continuous jacket part, and (ii) end walls which are provided at axial ends of the tube with one of the axial ends having an inlet and the other of the axial ends having an outlet, and wherein the tube has an outer surface that is defined by a variable diameter,
a filter body accommodated in the outer housing, the exhaust gas flowing through the filter body and being purified by it, and
wherein at least one of the end walls has an essentially cylindrical, reshaped jacket extension which is angled towards the tube and against which the tube rests in the radial direction.

2. The vehicle exhaust gas purification device according to claim 1, wherein at least one of the jacket extension and the associated end of the tube is narrowed radially inwards towards the axial ends thereof to form an insertion chamfer for fitting the jacket extension and the tube axially together.

3. The vehicle exhaust gas purification device according to claim 2, wherein at least one of the jacket extension and the associated tube end is plastically reshaped to form the insertion chamfer.

4. The vehicle exhaust gas purification device according to claim 1, wherein at least one of the jacket extension and the associated end of the tube is widened radially outwards the axial ends thereof to form an insertion chamfer for fitting.

5. The vehicle exhaust gas purification device according to claim 4, wherein at least one of the jacket extension and the associated tube end is plastically reshaped to form the insertion chamfer.

6. The vehicle exhaust gas purification device according to claim 1, wherein one of the jacket extension and the associated tube end is retracted radially farther inwards in comparison with the middle of the tube.

7. The vehicle exhaust gas purification device according to claim 1, wherein the end wall having the jacket extension has a funnel portion flaring towards the tube and a radial portion adjoining the funnel portion further towards the tube, the jacket extension adjoining the radial portion.

8. The vehicle exhaust gas purification device according to claim 1, wherein the jacket extension comprises a deep-drawn portion that extends to a trimmed free edge at a free end of the jacket extension.

9. The vehicle exhaust gas purification device according to claim 8, wherein the trimmed free edge comprises a plastically deformed portion that extends radially inwards.

10. The vehicle exhaust gas purification device according to claim 1, wherein an axially acting latching connection is provided between the tube and the jacket extension.

11. The vehicle exhaust gas purification device according to claim 10, wherein the latching connection comprises a pre-assembly location between the tube and the jacket extension.

12. The vehicle exhaust gas purification device according to claim 10, wherein the latching connection comprises at least one depression and at least one projection protruding into the depression.

13. The vehicle exhaust gas purification device according to claim 12, wherein an encircling projection is provided.

14. The vehicle exhaust gas purification device according to claim 12, wherein several projections are provided, spaced apart in the peripheral direction.

15. The vehicle exhaust gas purification device according to claim 1, wherein the end wall and the tube are one of welded, brazed and soldered to each other in the area of the jacket extension.

16. A method of producing a vehicle exhaust gas purification device that includes a multipart outer housing comprising a tube formed by a continuous jacket part and end walls at axial ends of the tube, with at least one of the end walls having a cylindrical, reshaped jacket extension that is angled towards the tube and which extends to a free end, comprising the steps of:
   (a) forming the tube to have a variable diameter and axially fitting the tube and the at least one end wall into each other such that the tube rests against the jacket extension in a radial direction, and
   (b) connecting the tube and the end wall with each other by one of welding, brazing and soldering.

17. The method according to claim 16, further comprising the step of:
   deep-drawing the end wall to form a funnel portion.

18. The method according to claim 16, further comprising the steps of:
   deep-drawing the end wall to shape the jacket extension, a flange projecting radially outwards from the jacket extension, and
   severing the flange.

19. The method according to claim 18, further comprising the step of:
   reshaping an edge, formed after the severing step, of the jacket extension inwards.

20. The method according to claim 16, further comprising the step of:
   locking the tube and the end wall in place when fitting them into each other.

21. The vehicle exhaust gas purification device according to claim 1 wherein the filter body is wrapped with a mat and wherein the tube defines an inner surface that engages an outer surface of the mat, and wherein the jacket extension extends to a free end that maintains a non-contact relationship with the mat.

22. The vehicle exhaust gas purification device according to claim 21 wherein the free end of the jacket extension is spaced from an end face of the mat such that an annular gap is provided between the free end and the end face of the mat.

23. The vehicle exhaust gas purification device according to claim 1 wherein the end wall comprises a one-piece component with a funnel portion transitioning to a radial portion which transitions to the jacket extension, and wherein the radial portion extends radially outwardly relative to the funnel portion.

24. The vehicle exhaust gas purification device according to claim 1 wherein a center portion of the tube is defined by a first diameter and wherein the tube includes at least one formed feature adjacent at least one of the axial ends defined by a second diameter that is different than the first diameter, the jacket extension being positioned in an overlapping relationship with the formed feature.

25. The vehicle exhaust gas purification device according to claim 24 wherein the at least one formed feature comprises a flared end at the at least one axial end, the second diameter at the flared end being greater than the first diameter.

26. The vehicle exhaust gas purification device according to claim 24 wherein the at least one formed feature comprises a reduced end at the at least one axial end, the second diameter at the reduced end being less than the first diameter.

27. The vehicle exhaust gas purification device according to claim 24 wherein the at least one formed feature comprises one of a dimple or continuous projection near the at least one axial end, with the dimple having the second diameter being less than the first diameter and the continuous projection having the second diameter being greater than the first diameter.

28. The method according to claim 16 including positioning the free end to be spaced from a mat wrapped around a filter body that is to be received within the outer housing such that an annular gap is formed between the free end of the jacket portion and an end surface of the mat.

29. The method according to claim 16 including defining an outer surface of a center portion of the tube by a first diameter and providing the tube with at least one formed feature adjacent at least one of the axial ends, the at least one formed feature being defined by a second diameter that is different than the first diameter, and including positioning the jacket extension in an overlapping relationship with the formed feature.

* * * * *